(12) United States Patent
Hsu (10) Patent No.: US 8,881,402 B2
(45) Date of Patent: Nov. 11, 2014

(54) ROLLER AND METHOD OF MAKING ROLLER

(71) Applicant: Chia-Ling Hsu, New Taipei (TW)

(72) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/631,709

(22) Filed: Sep. 28, 2012

(65) Prior Publication Data

US 2013/0171289 A1 Jul. 4, 2013

(30) Foreign Application Priority Data

Dec. 29, 2011 (TW) .............................. 100149672 A (51) Int. Cl.
 *B21K 1/02* (2006.01)
 *C25D 11/20* (2006.01)
 *C25D 11/02* (2006.01)

(52) U.S. Cl.
 USPC ....... 29/895.3; 29/895.31; 205/173; 205/223; 492/30; 492/33

(58) Field of Classification Search
 USPC ................... 29/895, 895.2, 895.21, 895.211, 29/895.23, 895.3, 895.31; 492/28, 30, 31, 492/33, 34, 35, 36; 205/173, 190, 206, 223
 See application file for complete search history.

(56) References Cited

U.S. PATENT DOCUMENTS

| | | | | |
|---|---|---|---|---|
| 5,480,596 A * | 1/1996 | Okubo et al. | ................ | 264/1.33 |
| 6,375,870 B1 * | 4/2002 | Visovsky et al. | ............ | 264/1.31 |
| 7,201,850 B2 * | 4/2007 | Kawanishi et al. | ................ | 216/9 |
| 7,296,517 B2 * | 11/2007 | Nishino et al. | ................ | 101/459 |
| 7,571,542 B2 * | 8/2009 | Nishino et al. | ............... | 29/895.3 |
| 7,648,760 B2 * | 1/2010 | Hatanaka et al. | ........... | 428/304.4 |
| 7,699,971 B2 * | 4/2010 | Hatanaka et al. | ............. | 205/324 |
| 7,722,754 B2 * | 5/2010 | Hatanaka et al. | ............. | 205/324 |
| 7,763,417 B2 * | 7/2010 | Rinehart et al. | ............. | 430/320 |
| 8,387,255 B2 * | 3/2013 | Ogino et al. | ............ | 29/895.212 |
| 8,512,614 B2 * | 8/2013 | Diefenderfer et al. | ........ | 264/219 |
| 8,545,708 B2 * | 10/2013 | Fujii et al. | ....................... | 216/11 |
| 8,652,317 B2 * | 2/2014 | Tsuda | ........................... | 205/173 |
| 2006/0219568 A1 * | 10/2006 | Hotta et al. | ................... | 205/173 |
| 2006/0275714 A1 * | 12/2006 | Rinehart et al. | ............. | 430/321 |
| 2007/0271791 A1 * | 11/2007 | Lai et al. | ......................... | 29/895 |
| 2007/0289945 A1 * | 12/2007 | Hatanaka et al. | .............. | 216/83 |
| 2008/0081173 A1 * | 4/2008 | Hatanaka et al. | .......... | 428/304.4 |
| 2008/0152941 A1 * | 6/2008 | Hatanaka et al. | ............. | 428/613 |
| 2008/0233519 A1 * | 9/2008 | Wood et al. | .................... | 430/321 |
| 2009/0145769 A1 * | 6/2009 | Tsuda | ........................... | 205/206 |
| 2010/0308497 A1 * | 12/2010 | David | ........................... | 264/224 |
| 2011/0036720 A1 * | 2/2011 | Tagawa et al. | .................. | 205/50 |
| 2011/0157704 A1 * | 6/2011 | Sato et al. | ...................... | 359/601 |
| 2012/0311861 A1 * | 12/2012 | Wu et al. | ........................ | 29/895 |
| 2013/0034698 A1 * | 2/2013 | Lee et al. | ....................... | 428/156 |
| 2013/0244005 A1 * | 9/2013 | Hsu | ................................ | 428/161 |
| 2013/0263453 A1 * | 10/2013 | Chang et al. | ............... | 29/895.21 |
| 2013/0302564 A1 * | 11/2013 | Takihara et al. | .............. | 428/141 |

FOREIGN PATENT DOCUMENTS

CN 101255588 B * 7/2012 ............. C25D 11/04
EP 1867757 A2 * 12/2007 ............. C25D 11/04

* cited by examiner

*Primary Examiner* — Essama Omgba (74) *Attorney, Agent, or Firm* — Novak Druce Connolly Bove + Quigg LLP (57) ABSTRACT

A roller for producing optical films is disclosed. The roller includes a cylindrical main body and a micro-structured layer surrounding a circumferential surface of the main body. The microstructure layer includes a number of microstructures on its surface away from the main body. The microstructure layer is made from ethylene tetrafluoroethylene.

11 Claims, 10 Drawing Sheets

ROLLER AND METHOD OF MAKING ROLLER

BACKGROUND

1. Technical Field

The present disclosure relates to rollers, and particularly, relates to a roller for producing antireflective films and a method for making the pressing roller.

2. Description of Related Art

Nowadays, optical films are employed in many optical elements to perform predetermined functions. For example, an antireflective film is configured for preventing light reflection between optical elements. The antireflective film includes a number of cone-shaped microstructures for reducing glare, increasing light transmittance, and enhancing optical qualities of the optical elements.

The antireflective film is typically produced by a vacuum evaporation method, and the microstructures is formed on the antireflective film by an etching or an engraving method. However, such an antireflective film has a high cost and low producing efficiency.

What is needed therefore is a pressing roller and a method for making the pressing roller addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
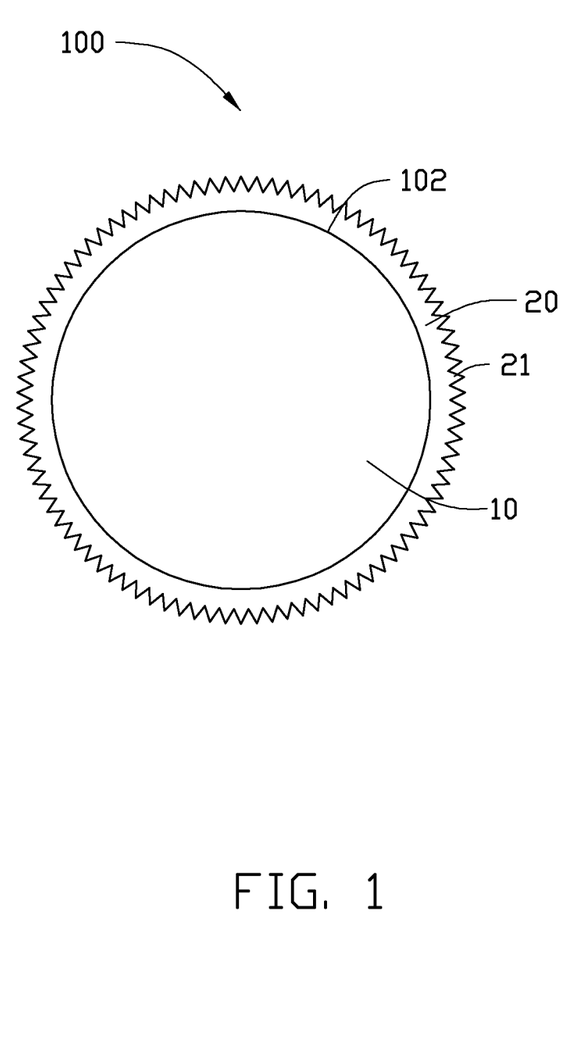
FIG. 1 is a schematic view of a roller, according to an exemplary embodiment of the present disclosure.

Referring to FIG. 1, a roller 100 for producing optical films using a roll-to-roll process, according to an exemplary embodiment, is shown. The roller 100 includes a main body 10 and a micro-structured layer 20 surrounding a circumferential surface 102 of the main body 10.

The main body 10 is substantially cylindrical-shaped. The main body 10 is made of metal or alloy. In this embodiment, the main body 10 is made of copper.

The micro-structured layer 20 is made from ethylene tetrafluoroethylene (ETFE). The micro-structured film 20 includes an array of microstructures 21 formed on its surface. The micro-structured layer 20 is adhered on the circumferential surface 102 of the main body 10, and the microstructures 21 radially protrude away from the main body 10. In this embodiment, each microstructure 21 is substantially cone-shaped.

The roller 100 can be employed to produce an optical film by a roll-to-roll manner. In producing the optical film, the roller 100 presses on a moldable material of the optical film, the microstructures 21 print a number of complementary microstructures on the molding material, thus the microstructures 21 are transferred to the optical film. In such a manner, the optical film can be continuously produced, and the optical film can be cut into a number pieces of optical films with required size(s). Therefore, a producing efficiency of the optical film is increased and a cost of the optical film is reduced.

Furthermore, the anti-adhesion character of the ETFE material, the molded optical films can be easily divided from the roller 100.

Figure 2:
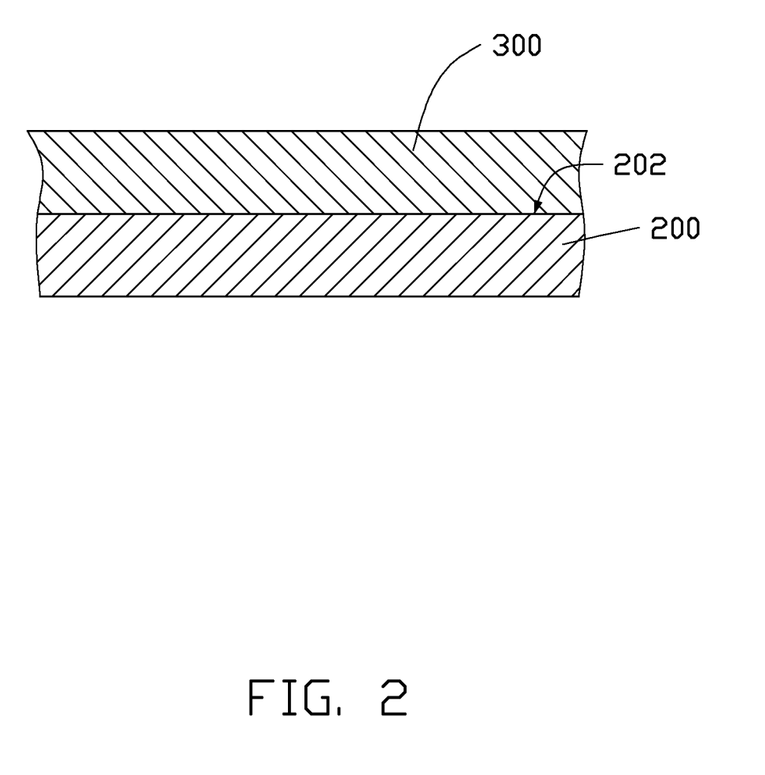
FIGS. 2-10 are schematic views showing successive stages of a method for making the roller of FIG. 1.

FIGS. 2-9 show successive stages of a method for making the roller 100, according to an exemplary embodiment. The method includes following steps:

Referring to FIG. 2, a substrate 200 is provided. The substrate 200 includes a bright polished surface 202. The substrate 200 can be made from metal or monocrystalline silicon. In this embodiment, the substrate 200 is made from monocrystalline silicon.

An aluminum film 300 is formed on the bright polished surface 202 of the substrate 200. The aluminum film 300 can be formed on the substrate 200 by a vacuum evaporation method, or a magnetron sputtering method, for example.

Figure 3:
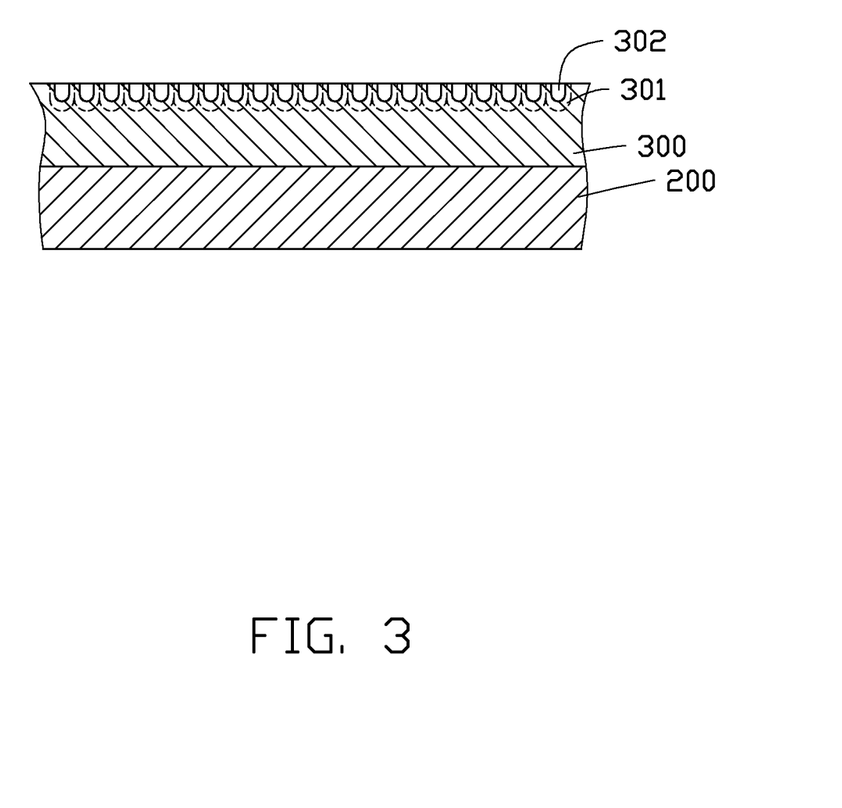
Figure 4:
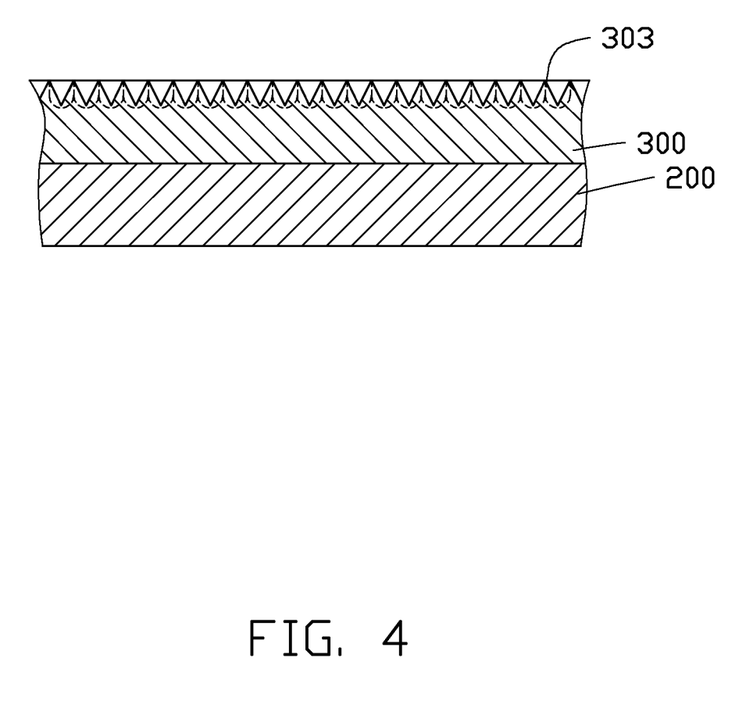

Referring to FIGS. 3-4, a number microstructures 302 are formed on a surface of the aluminum film 300. In detail, the microstructure 302 is produced as follows: putting the substrate 200 into an electrolytic oxidation tank containing electrolyte; applying a voltage to the electrolyte for anodizing the aluminum film 300. After the process, a microporous alumina coating 301 is formed on a surface of the aluminum film 300, and the microstructures 302 are formed in the alumina coating 301. The microstructures 302 are nano-scale pores. The electrolyte can be sulfuric acid solution, phosphoric acid solution or oxalic acid solution. In this embodiment, the electrolyte is oxalic acid solution with concentration of about 0.1-1 mol/liter. In the process, a temperature of the electrolyte is controlled in a range of 5-25° C., a voltage is controlled in a range of 40-60V, and an anodizing time is controlled in a range about 10-50 minutes. In one embodiment, the concentration of the oxalic acid solution is 0.3 mol/liter, the temperature of the electrolyte is 17° C., and the voltage is 40V.

The microstructures 302 in the alumina coating 301 are enlarged to form a number of cone-shaped microstructures 303. In detail, dipping the anodized substrate 200 in an phosphoric acid solution, applying a voltage to the phosphoric acid solution to dissolve the alumina around each microstructure 302, then cone-shaped microstructures 303 can be generated. In this embodiment, a mass percent concentration of the phosphoric acid solution is 5%, a temperature of the phosphoric acid solution is 30° C., and the microstructures 302 are enlarged once for 8 minutes.

To generate optimal cone-shaped microstructures, the enlarging process for the microstructures 302 can be repeated a number of times. After each of the microstructures 302 have been enlarged, the substrate 200 is purged. In the embodiment, the enlarging process and purging process are repeated five times.

Figure 5:
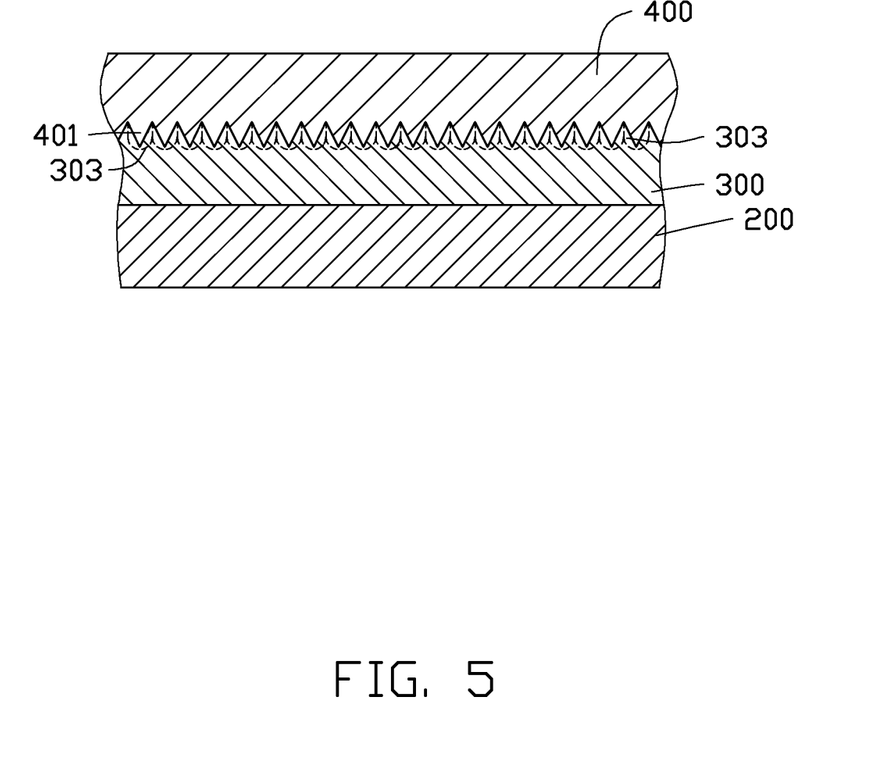
Figure 6:
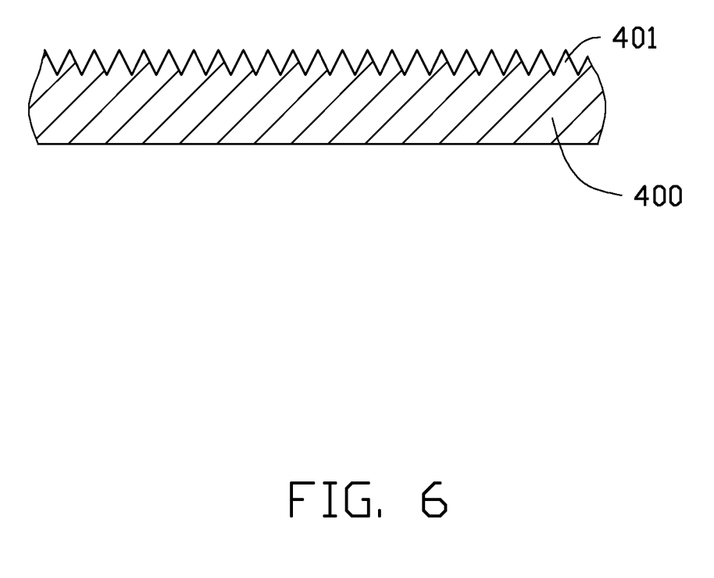

Referring to FIGS. 5-6, the microstructures 303 are transferred on a surface of a metal molding plate 400 by an electrotype method. In detail, dipping the enlarge processed substrate 200 and an electrotype metal plate (not shown) into an electrolyte, the electrotype metal plate is connected to an anode, and the substrate 200 is connected to a cathode. A current is applied to the electrolyte. Under the electrolytic action, an electrotype metal layer is deposited on a surface of the alumina coating 301. The substrate 200 is taken out of the electrolyte when the electrotype metal layer is deposited on the alumina coating 301 for a predetermined thickness. Then the substrate 200 is dipped into an etching solution to dissolve the alumina coating 301, thus the electrotype metal layer is divided from the substrate 200. A surface of the electrotype metal layer forms a number of microstructures 401 corresponding to the microstructures 302 in the alumina coating 301. The electrotype metal layer finally forms the metal molding plate 400. A material of the metal molding plate 400 can be metal or alloy, such as copper, nickel, nickel-cobalt alloy, or cobalt-tungsten alloy, for example. In this embodiment, the material used for the metal molding plate 400 is nickel.

Figure 7:
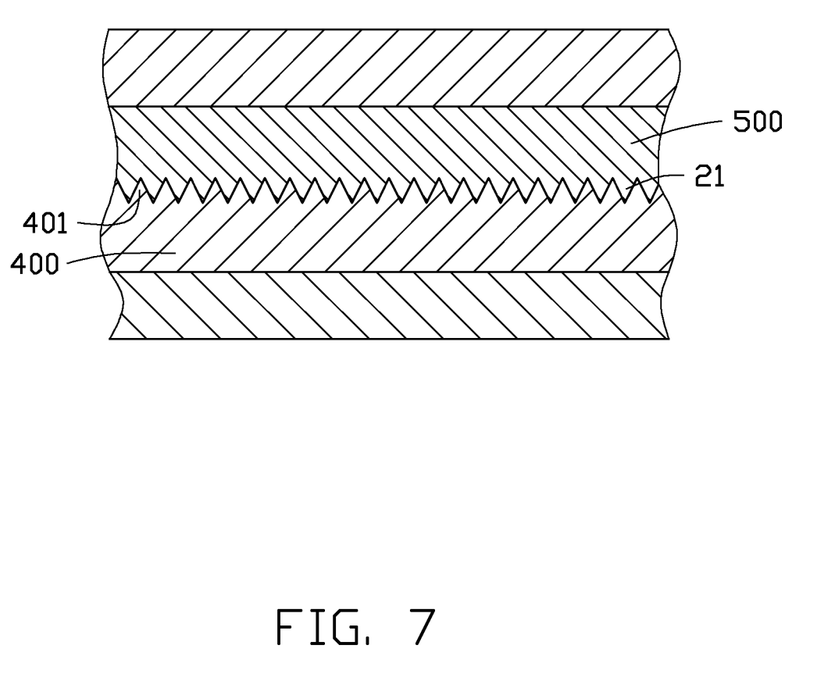
Figure 8:
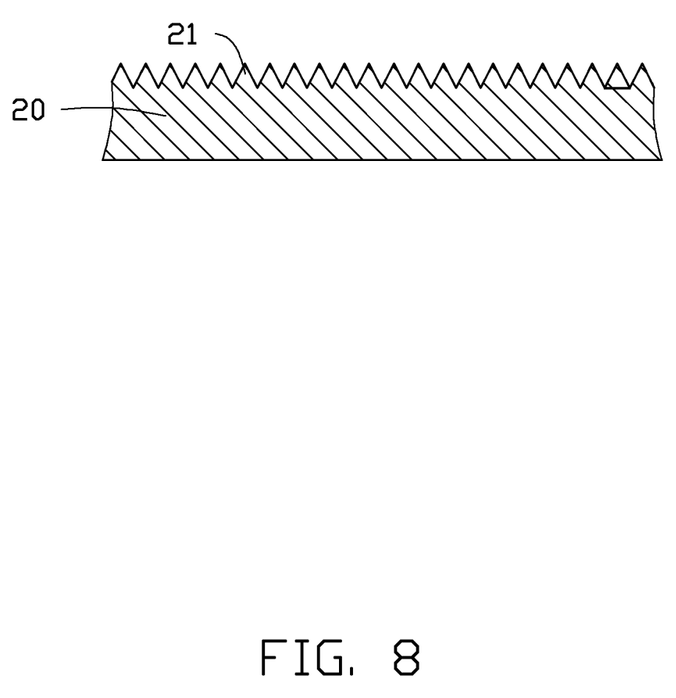
Figure 9:
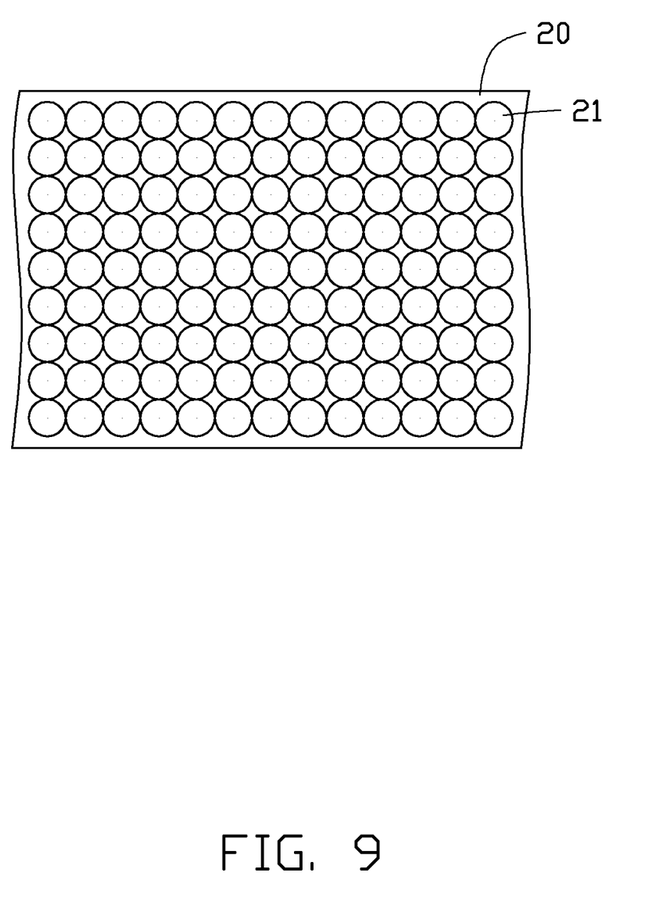

Referring to FIGS. 7-8, a micro-structured layer 20 is molded by the metal molding plate 400. In detail, putting an ETFE film 500 on a surface of the metal molding plate 400 with the microstructures 401; putting the metal molding plate 400 with the ETFE film 500 into a hot stamping machine (not shown); heating the ETFE film 500 to be semi melted, in this embodiment, a heat temperature is 200° C.; applying pressure on the ETFE film 500 and keeping the pressure for 5-10 minutes; cooling the ETFE film 500 while still under the pressure; dividing the ETFE film 500 from the metal molding plate 400, a number of microstructures 21 corresponding to the microstructures 401 is formed on a surface of the ETFE film 500. The ETFE film 500 with the microstructures 21 forms the microstructure layer 20. FIG. 9 shows a plan view of a portion of the microstructure layer 20.

Figure 10:
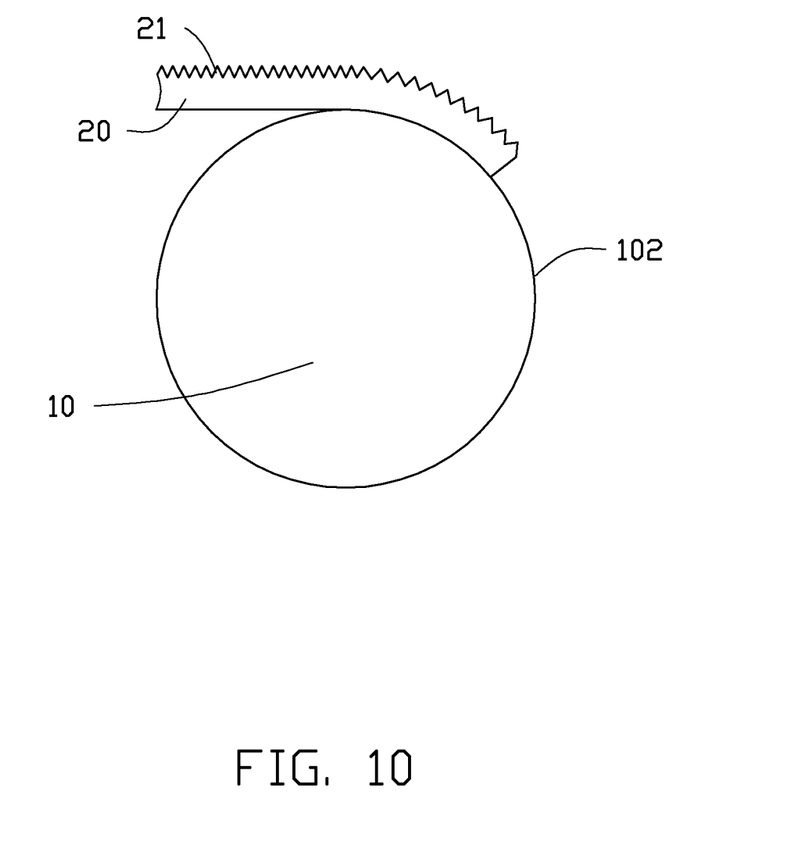

Referring to FIG. 10, a cylindrical main body 10 is provided, the microstructure layer 20 is adhered on a circumferential surface 102 of the main body 10 with the microstructures 21 protruding away from the main body 10.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A method for making an roller, comprising:
    providing a substrate;
    forming an aluminum film on a surface of the substrate;
    anodizing the aluminum film to form a plurality of first microstructures by immersing the substrate with the aluminum film in an electrolytic oxidation solution and applying a voltage to the electrolytic oxidation solution;
    enlarging the first microstructures to form a plurality of cone-shaped second microstructures by dipping the substrate which has been anodized in a phosphoric acid solution and applying a voltage to the phosphoric acid solution;
    transferring the cone-shaped second microstructures on a surface of a metal molding plate;
    molding a micro-structured layer using the metal molding plate, the metal molding plate printing a plurality of third microstructures corresponding to the cone-shaped second microstructures; and
    attaching the micro-structured layer on a circumferential surface of a cylindrical main body, with the third microstructures of the micro-structured layer protruding away from the main body.

2. The method of claim 1, wherein the substrate is made from metal or monocrystaline silicon.

3. The method of claim 1, wherein the electrolyte is selected from the group consisting of sulfuric acid solution, phosphoric acid solution and oxalic acid solution.

4. The method of claim 1, wherein the electrolyte is oxalic acid solution, a concentration of the electrolyte is in a range of 0.1-1 mol/liter, a temperature of the electrolyte is controlled in a range of 5-25° C., a voltage is controlled in a range of 40-60V, and an anodizing time is controlled in a range of 10-50 minutes.

5. The method of claim 4, wherein the concentration of the oxalic acid solution is 0.3 mol/liter, the temperature of the electrolyte is 17° C., and the voltage is 40V.

6. The method of claim 1, wherein a mass percent concentration of the phosphoric acid solution is 5%, a temperature of the phosphoric acid solution is 30° C., and the microstructures are enlarged for 8 minutes one time.

7. The method of claim 1, wherein the second microstructures are transferred on the metal molding plate by an electrotypist method.

8. The method of claim 7, wherein the electrotypist comprises:
    dipping the enlarge processed substrate and an electrotype metal plate into an electrolyte, the electrotype plate being connected to an anode, and the substrate being connected to an cathode;
    applying a current to the electrolyte to generate an electrolytic action;
    depositing an electrotype metal layer on a surface of the alumina coating under the electrolytic action for a predetermined thickness;
    taking the substrate out of the electrolyte; and
    dipping the substrate into an etching solution to dissolve the alumina coating to divide the electrotype metal layer from the substrate.

9. The method of claim 8, wherein a material of the metal molding plate is nickel.

10. The method of claim 1, wherein the micro-structured layer is molded by steps:
    putting an ETFE film on a surface of the metal molding plate with the second microstructures;
    putting the metal molding plate with the ETFE film into a hot stamping machine;
    heating the ETFE film to be semi-melted
    applying a pressure on the ETFE film and keeping the pressure for 5-10 minutes;
    cooling the ETFE film while still under the pressure.

11. The method of claim 10, wherein a temperature for heating the ETFE film is 200° C.

\* \* \* \* \*